US011023033B2

(12) United States Patent
Soroker et al.

(10) Patent No.: US 11,023,033 B2
(45) Date of Patent: Jun. 1, 2021

(54) ADAPTING A DISPLAY OF INTERFACE ELEMENTS ON A TOUCH-BASED DEVICE TO IMPROVE VISIBILITY

(71) Applicant: International Business Machines Corporation, Armonk, NY (US)

(72) Inventors: Danny Soroker, Yorktown Heights, NY (US); Sharon Mary Trewin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/243,364

(22) Filed: Jan. 9, 2019

(65) Prior Publication Data
US 2020/0218335 A1    Jul. 9, 2020

(51) Int. Cl.
| | | |
|---|---|---|
| *G06F 3/0488* | (2013.01) | |
| *G06F 3/01* | (2006.01) | |
| *G06F 3/16* | (2006.01) | |
| *G06F 3/0484* | (2013.01) | |

(52) U.S. Cl.
CPC ............ *G06F 3/011* (2013.01); *G06F 3/0488* (2013.01); *G06F 3/04845* (2013.01); *G06F 3/167* (2013.01)

(58) Field of Classification Search
CPC .................................................. G06F 3/0488
USPC ......................................................... 715/727
See application file for complete search history.

(56) References Cited

U.S. PATENT DOCUMENTS

| | | | | |
|---|---|---|---|---|
| 5,402,152 A | * | 3/1995 | Needham | G06F 3/04812 345/179 |
| 7,353,252 B1 | * | 4/2008 | Yang | G06Q 10/10 709/204 |
| 8,464,180 B1 | * | 6/2013 | Kirkham | G06F 3/04817 715/810 |
| 8,519,971 B1 | * | 8/2013 | Mackraz | G06F 3/0412 345/173 |
| 9,081,498 B2 | | 7/2015 | Thorsander et al. | |
| 10,042,655 B2 | | 8/2018 | Kaufthal et al. | |
| 10,067,645 B2 | | 9/2018 | King et al. | |
| 10,073,541 B1 | * | 9/2018 | Baldwin | G06F 1/1694 |
| 10,318,034 B1 | * | 6/2019 | Hauenstein | G06F 3/0486 |
| 2008/0165255 A1 | * | 7/2008 | Christie | G06F 3/04883 348/207.99 |
| 2009/0167702 A1 | * | 7/2009 | Nurmi | G06F 3/04883 345/173 |
| 2010/0066763 A1 | * | 3/2010 | Macdougall | G06F 1/1626 345/656 |

(Continued)

OTHER PUBLICATIONS

Mel, et al., "The NIST Definition of Cloud Computing". Recommendations of the National Institute of Standard and Technology. Nov. 16, 2015.

*Primary Examiner* — Daniel Rodriguez
(74) *Attorney, Agent, or Firm* — Anthony Curro, Esq.; McGinn I.P. Law Group, PLLC

(57) ABSTRACT

A display adaption method, system, and computer program product include determining an obscured area of an interface of a screen that is obscured by a user, learning a pattern of the obscured area of the screen that is obscured over a time frame, and adapting the interface of the screen to change the interface of the screen to change an interference by the user with the interface of the screen such that the obscured area is reduced.

19 Claims, 12 Drawing Sheets

(56) References Cited

U.S. PATENT DOCUMENTS

| | | | |
|---|---|---|---|
| 2010/0097331 A1* | 4/2010 | Wu | G06F 3/0488 345/173 |
| 2010/0185989 A1* | 7/2010 | Shiplacoff | G06F 3/0416 715/856 |
| 2010/0192102 A1* | 7/2010 | Chmielewski | G06F 3/04883 715/834 |
| 2011/0117886 A1* | 5/2011 | Travis | H04W 68/00 455/412.2 |
| 2011/0291989 A1* | 12/2011 | Lee | G06F 3/043 345/175 |
| 2012/0032979 A1* | 2/2012 | Blow | G06F 3/04817 345/647 |
| 2012/0324384 A1* | 12/2012 | Cohen | G06F 3/04886 715/765 |
| 2013/0162562 A1* | 6/2013 | Fujiki | G06F 3/041 345/173 |
| 2013/0234949 A1* | 9/2013 | Chornenky | G06F 3/041 345/169 |
| 2013/0285922 A1* | 10/2013 | Alberth, Jr. | G06F 1/1626 345/173 |
| 2014/0028602 A1* | 1/2014 | Morinaga | G06F 3/0414 345/173 |
| 2014/0152526 A1* | 6/2014 | Greig | H04B 5/0056 343/866 |
| 2014/0152583 A1* | 6/2014 | Bastide | G06F 3/0488 345/173 |
| 2014/0160159 A1* | 6/2014 | Thorn | G06F 3/011 345/633 |
| 2014/0168135 A1* | 6/2014 | Saukko | H04M 1/72463 345/174 |
| 2014/0282203 A1* | 9/2014 | Pasquero | G06F 3/04886 715/773 |
| 2014/0300560 A1* | 10/2014 | An | G06F 3/041 345/173 |
| 2014/0368422 A1* | 12/2014 | Gupta | G06F 3/0304 345/156 |
| 2015/0015495 A1* | 1/2015 | Narayanaswami | G06F 3/04186 345/173 |
| 2015/0042591 A1* | 2/2015 | Li | G06F 3/0488 345/173 |
| 2015/0046825 A1* | 2/2015 | Li | G06F 3/0481 715/728 |
| 2015/0169130 A1* | 6/2015 | Gao | G06F 40/166 345/472.2 |
| 2015/0177826 A1* | 6/2015 | Aizawa | G06F 3/0488 345/173 |
| 2015/0261373 A1* | 9/2015 | Smus | G06F 3/044 345/174 |
| 2015/0332031 A1* | 11/2015 | Mistry | H04W 12/06 726/19 |
| 2016/0054904 A1* | 2/2016 | Xia | G06F 3/04883 715/764 |
| 2016/0165039 A1* | 6/2016 | Arai | H04M 1/72454 455/420 |
| 2016/0188197 A1* | 6/2016 | Ryu | G06F 1/1626 345/156 |
| 2016/0196002 A1* | 7/2016 | Kuge | G06F 3/0412 345/178 |
| 2016/0216753 A1* | 7/2016 | Shedletsky | G06F 1/163 |
| 2016/0291731 A1* | 10/2016 | Liu | G06F 3/0488 |
| 2016/0291827 A1* | 10/2016 | Ionita | A63F 13/2145 |
| 2016/0349851 A1* | 12/2016 | Eskolin | G06F 3/04883 |
| 2017/0017393 A1* | 1/2017 | Luo | G06F 3/017 |
| 2017/0038926 A1* | 2/2017 | Fram | G06F 3/0488 |
| 2017/0060398 A1* | 3/2017 | Rastogi | G06F 3/0482 |
| 2017/0068367 A1* | 3/2017 | Francis | G06F 16/248 |
| 2017/0068442 A1* | 3/2017 | Kawamura | G06F 3/04842 |
| 2017/0090571 A1* | 3/2017 | Bjaerum | A61B 8/4254 |
| 2017/0147160 A1* | 5/2017 | Snyder | G06F 3/04842 |
| 2017/0177203 A1* | 6/2017 | Davidov | G06F 3/04883 |
| 2017/0197617 A1* | 7/2017 | Penilla | B60W 30/09 |
| 2017/0228095 A1* | 8/2017 | Domaradzki | G06F 3/0481 |
| 2017/0236330 A1* | 8/2017 | Seif | G06F 3/0202 345/633 |
| 2017/0269812 A1* | 9/2017 | Luo | G09G 5/32 |
| 2018/0004386 A1* | 1/2018 | Hinckley | G06F 3/0416 |
| 2018/0136718 A1* | 5/2018 | Im | G02B 27/017 |
| 2018/0173929 A1 | 6/2018 | Han et al. | |
| 2018/0288004 A1* | 10/2018 | Fei | H04W 76/12 |
| 2018/0307270 A1* | 10/2018 | Pantel | G06F 1/1605 |
| 2018/0330694 A1* | 11/2018 | Klein | G06F 9/4411 |
| 2018/0356904 A1* | 12/2018 | Disano | G06F 3/1423 |
| 2018/0357984 A1* | 12/2018 | Xia | G06K 9/00355 |
| 2019/0018661 A1* | 1/2019 | Srinivasan Natesan | G16H 20/00 |
| 2019/0265831 A1* | 8/2019 | Sinnott | G06F 3/0416 |
| 2020/0174654 A1* | 6/2020 | Blanchard | G06F 3/04883 |

* cited by examiner

ADAPTING A DISPLAY OF INTERFACE ELEMENTS ON A TOUCH-BASED DEVICE TO IMPROVE VISIBILITY

BACKGROUND

The present invention relates generally to a display adaption method, and more particularly, but not by way of limitation, to a system, method, and computer program product for adapting the display of interface elements on a touch-based device to improve visibility.

On a touch-based device, such as a smart phone or tablet or embedded devices such as in a car, a user typically uses their fingers to interact with the applications running on the device. One issue with using a finger is that the rest of the hand obscures some part of the interface, and in some situations can literally "get in the way" of using the interface.

A typical example is making a selection between lists of radio buttons where, in English, the text label is typically to the right of the button. Thus, it will likely be partially obscured by a right-handed user. Another example may be where instructions pertaining to a widget are partially hidden when moving the finger to touch the widget. Another example is when information changes in an occluded area, and the user is not aware of the change.

Conventional techniques include adjusting the sensitive area of a touch target dependent on the user's viewing angle. However, the conventional techniques do not consider changing the visual appearance of the screen (i.e., re-arranging interface elements).

SUMMARY

Thus, the inventors have identified a need in the art for an improved interface adjusting technique for an accommodation to address a problem of items being obscured by a user's finger, hand or arm.

In an exemplary embodiment, the present invention provides determining an obscured area of an interface of a screen that is obscured by a user, learning a pattern of the obscured area of the screen that is obscured over a time frame, and adapting the interface of the screen to change the interface of the screen to change an interference by the user with the interface of the screen such that the obscured area is reduced.

One or more other exemplary embodiments include a computer program product and a system, based on the method described above.

Other details acid embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
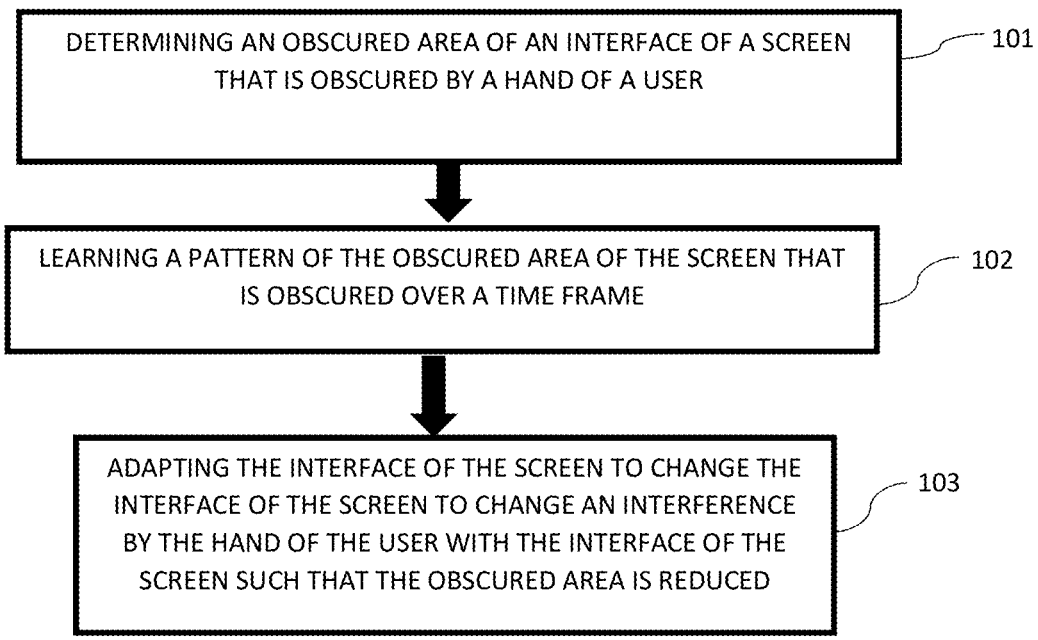
FIG. 1 exemplarily shows a high-level flow chart for a display adaption method 100 according to an embodiment of the present invention.

The invention will now be described with reference to FIGS. 1-12, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a display adaption method 100 according to the present invention can include various steps for adapting an interface configuration of a touch-screen device to reduce an obscured area caused by a user's hand and to adjust the configuration of the interface based on a reach of the user's hand.

Figure 10:
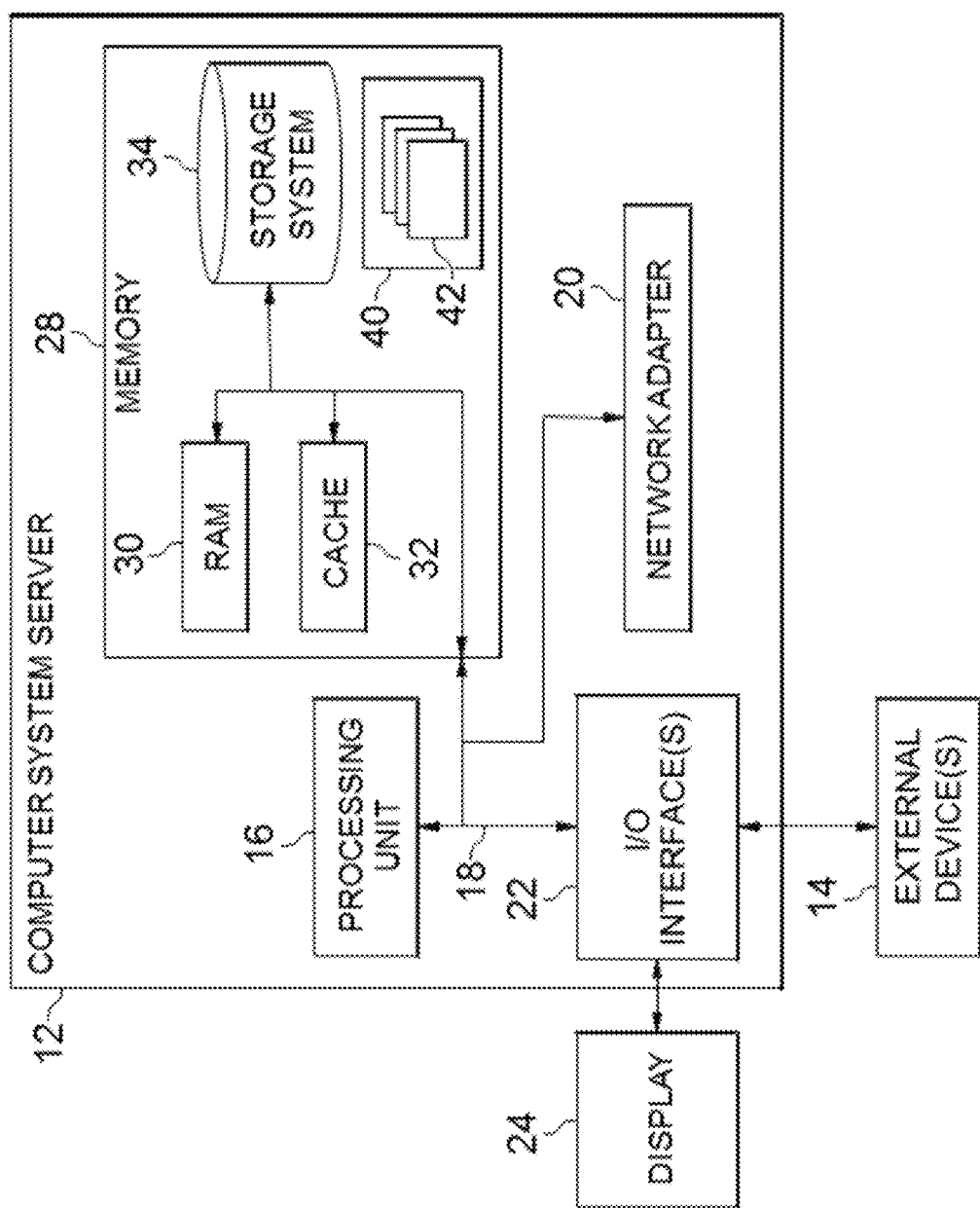
FIG. 10 depicts a cloud-computing node 10 according to an embodiment of the present invention.

By way of introduction of the example depicted in FIG. 10, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 12), it is nonetheless understood that the present invention can be implemented outside of the cloud environment.

The method 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems humans) that all agree are cognitive.

Cognitive states are defined as functions of measures of a host's total behavior collected over some period of time from at least one personal information collector including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant sub graph and its associated feature nodes and edges within a subgraph feature space.

Referring to FIG. 1, in step 101, an obscured area is determined of an interface of a screen that is obscured by a user in step 102, a pattern of the obscured area of the screen that is obscured is learned over a time frame. And, in step 103, the interface of the screen is adapted to change the interface of the screen to change an interference by the user with the interface of the screen such that the obscured area is reduced (or eliminated).

That is, the invention can first detect which parts of the screen are obscured by a user (e.g., a user's hand, other body portion such as an arm, elbow, etc., eye-wear, etc.) based on a pattern of their hand movement over a time frame (e.g., a history of their hand movement) on the screen. The pattern is detected over a time frame that may be preset (e.g., one-hour, one-day, etc.) or adjusted dynamically to adapt to a user's change in motion over the screen.

And, in one embodiment, the pattern may be detected based on a specific application on the touch-screen device opened at the time of movement (e.g., a user will have different hand movement patterns when accessing their home screen vs. a gaming application). Based on the pattern, an area of the screen (i.e., obscured area) is inferred in which the user cannot see the screen because of their hand. Also, a hand which a user is using (e.g., left-hand or right-hand) is inferred based on the orientation of the obscured area.

Moreover, the invention may learn where the user's eyes are directed on the touch-screen device based on the movement of the user's hand. In other words, hand patterns indicate where the user's eyes are on the screen based on the user moving their hand to or away from particular regions of the screen so that the user can see parts of the screen.

Then, an interface of the touch-screen device can be proactively adapted based on the learned pattern of the obscured area. For example, icons, graphical user interface (GUI) elements, text, etc. may be re-located on the screen to a second area of the screen that the obscured area does not overlap (e.g., an area of the screen that is always visible to the user based on their learned hand movement pattern).

In one embodiment, a user-interface layout of an application may be re-configured based on the pattern learned over time. For example, each new application the user downloads, opens, uses, etc. may be re-configured to move the GUI elements within the application to an area of the screen that does not overlap with the obscured area. Indeed, a digital book may re-configure the text on the screen such that the obscured area of the screen never displays text. As a result, the user does not need to continuously relocate their hand as they read to the bottom of a page of the book (i.e., typically a user's hand will cover a portion of the text and each time the user reads this portion they need to move their hand on the device). For example, if the user always holds their hand in the bottom right portion of the screen (e.g., the learned pattern indicates the obscured area is the bottom right), the text of a digital book may be omitted from this area of the screen so that the user does not need to move their hand each time they reach the end of the page.

In one embodiment, a questionnaire with a "yes" or "no" answer at the end of the text may be re-formatted to flip the answer and "yes" or "no" selection based on the user being left-handed or right-handed.

The detection of the pattern can be performed via at least one camera on the device, near-field detection, pressure-sensitive detection, etc.

The adapting of the user-interface may be performed by transforming the display via a geometric projection. In one embodiment, the interface transformation projects a circle centered at the touch point to an unobscured wedge. In another embodiment, the interface transformation linearly compresses the display to an unobscured rectangle.

In one embodiment, the adapting the interface is performed by moving at least one displayed element, by zooming and transforming the part of the displayed being pointed to, by detecting and making visible the part of the display that is obscured by the user's hand or arm, by detecting and making perceivable any changes in the part of the display that is obscured by the user's hand or arm, by adaptively laying out the next screen in a series of screens, by speaking aloud obscured text that is related to the user's current action, etc.

Figure 2:
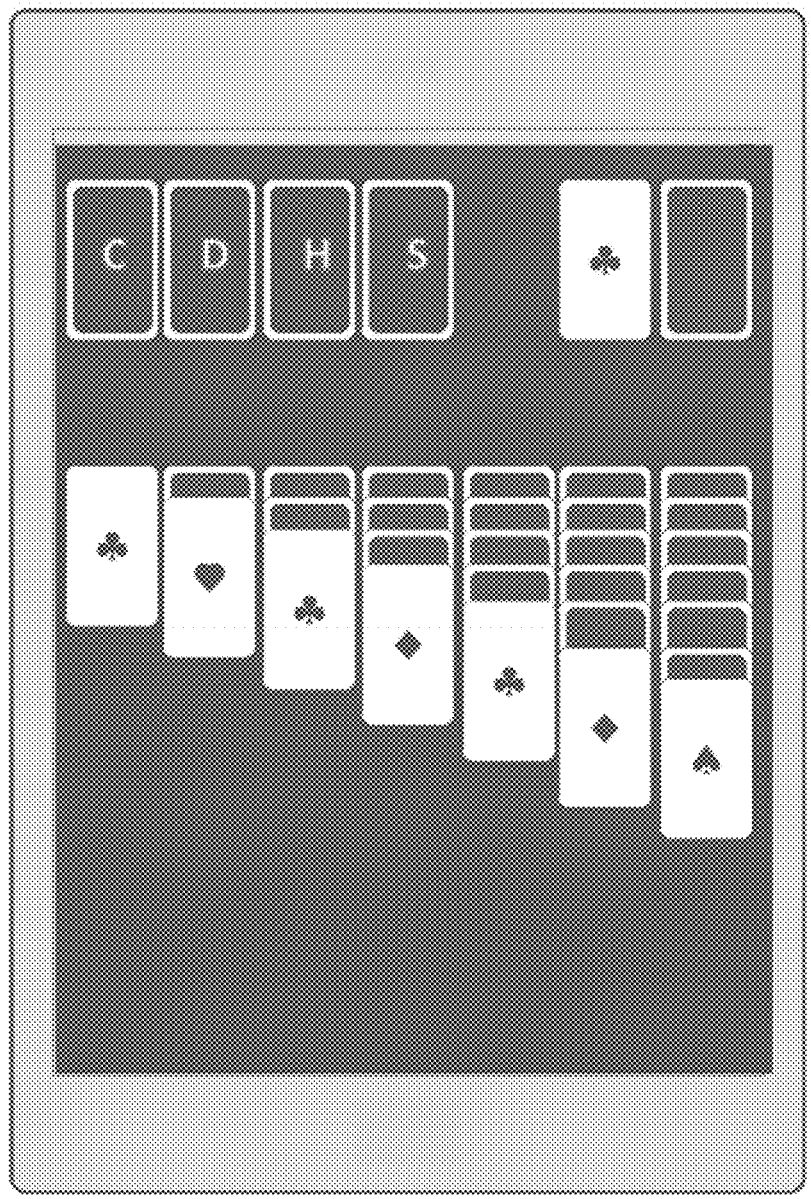
FIG. 2 exemplarily depicts a card game default layout on a touch-screen device according to an embodiment of the present invention.
Figure 3:
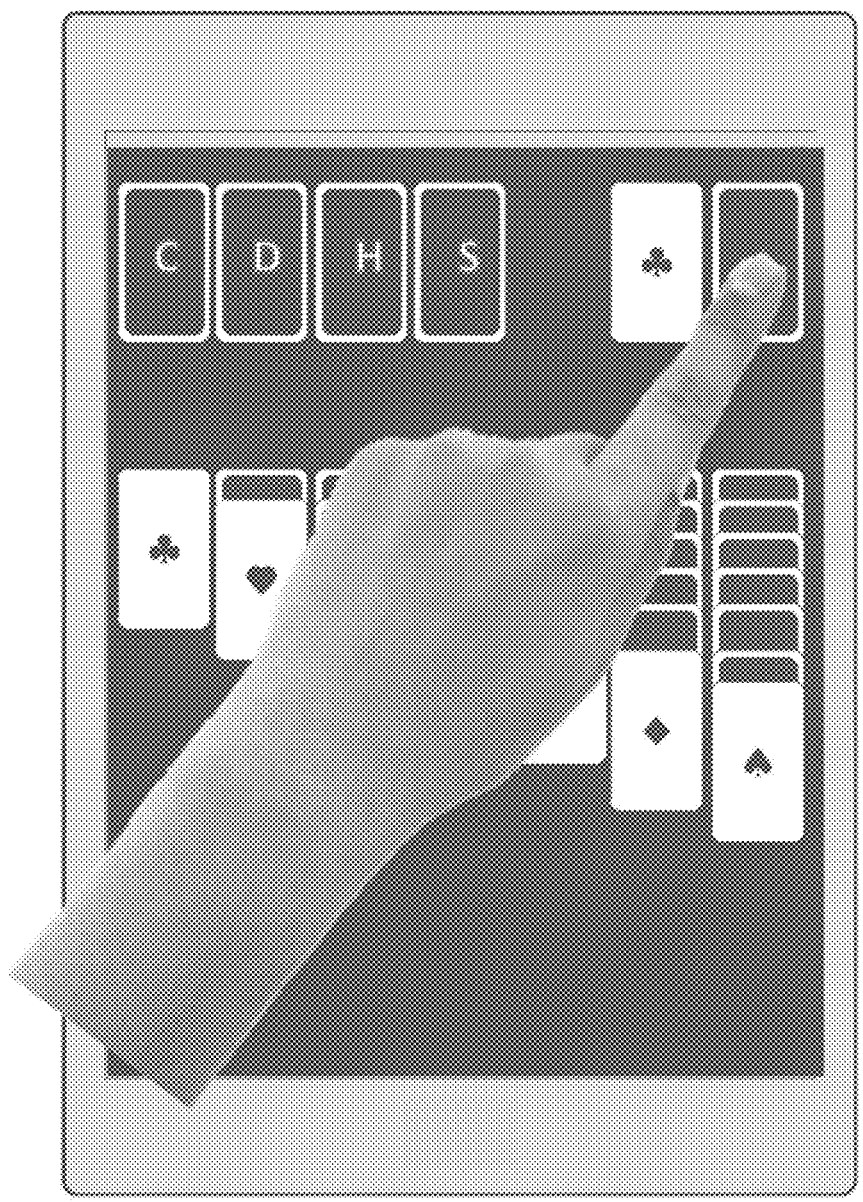
FIGS. 3-4 exemplarily depict a user obscuring the card game default layout on the touch-screen device according to an embodiment of the present invention.
Figure 4:
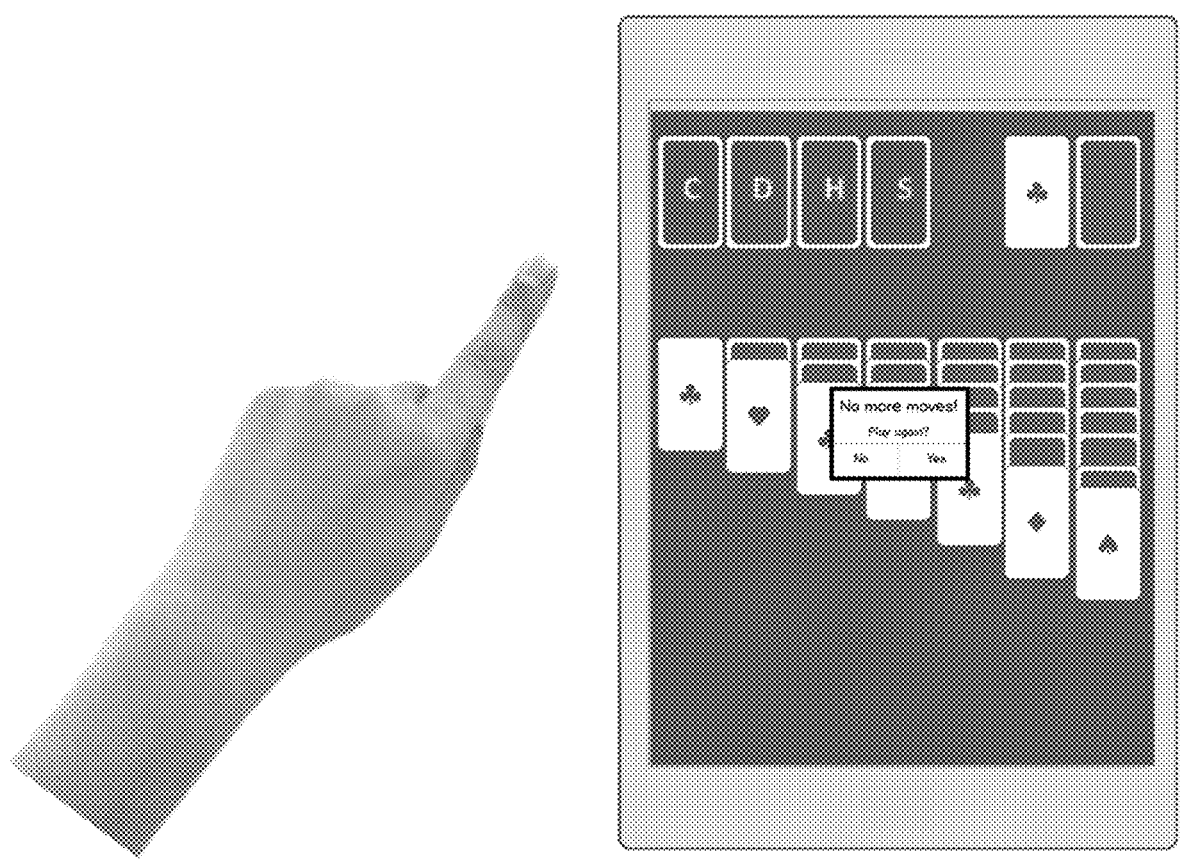

With reference to FIGS. 2-9, a default interface layout for a card game is shown on a touch-screen device in FIG. 2. The game play involves tapping the top right card repeatedly, hut this user is using their left hand, which is obscuring the other cards (e.g., as shown in FIG. 3). As shown in FIG. 4, the user's hand is also obscuring an alert box that has popped up on the screen (e.g., the user's hand location in FIG. 3 was obscuring the location of the box).

Figure 5:
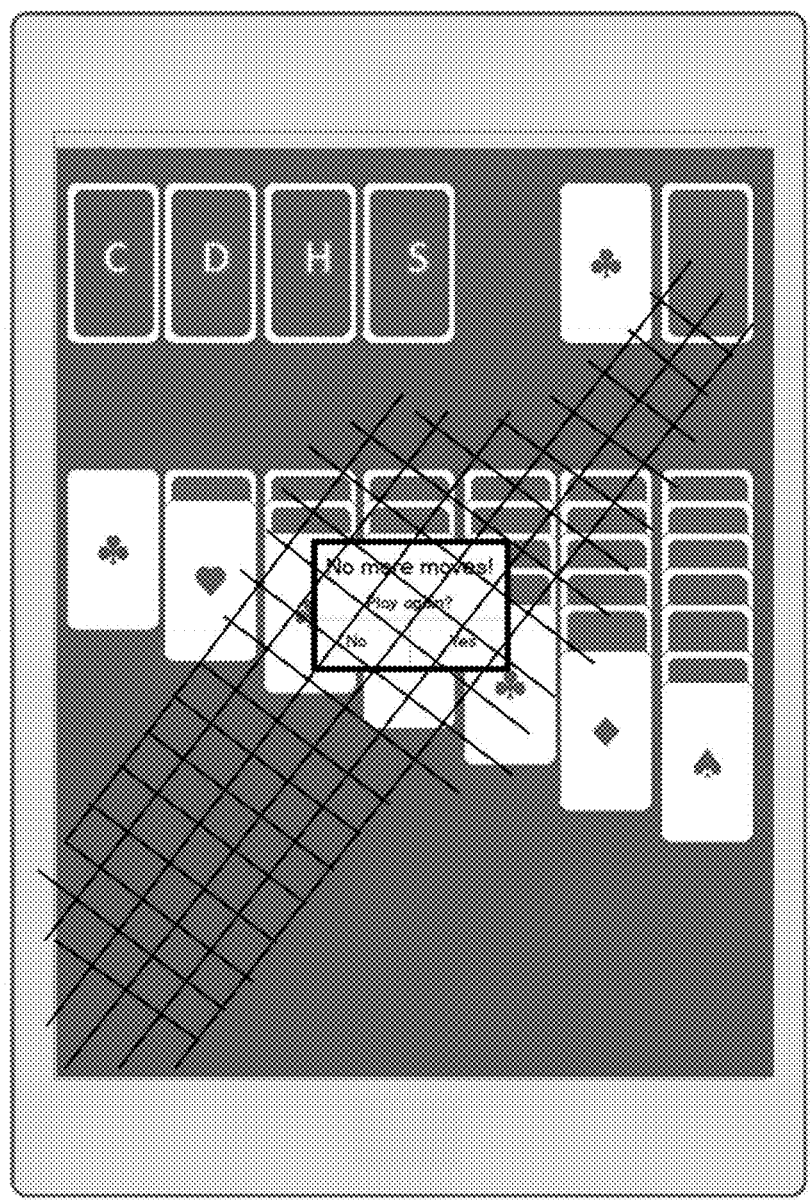
FIGS. 5-6 exemplarily depict a calculated the obscured area of the screen according to an embodiment of the present invention.
Figure 6:
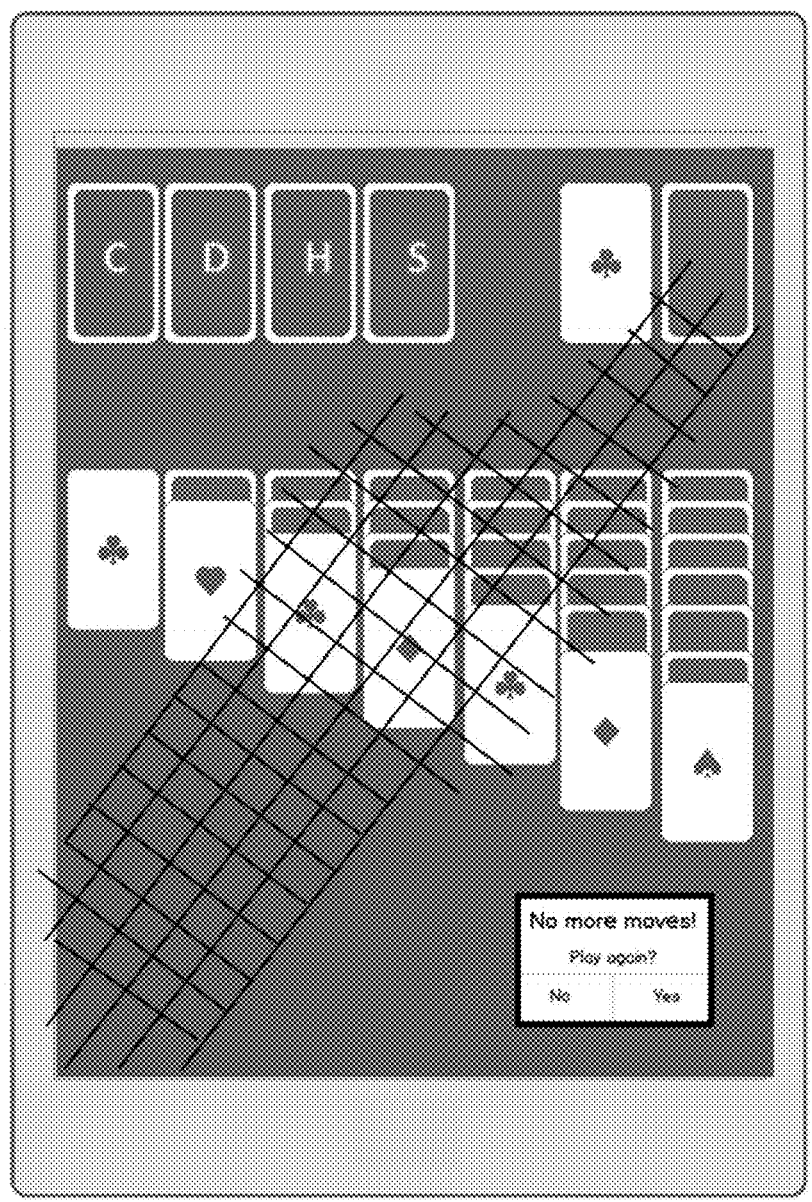
Figure 7:
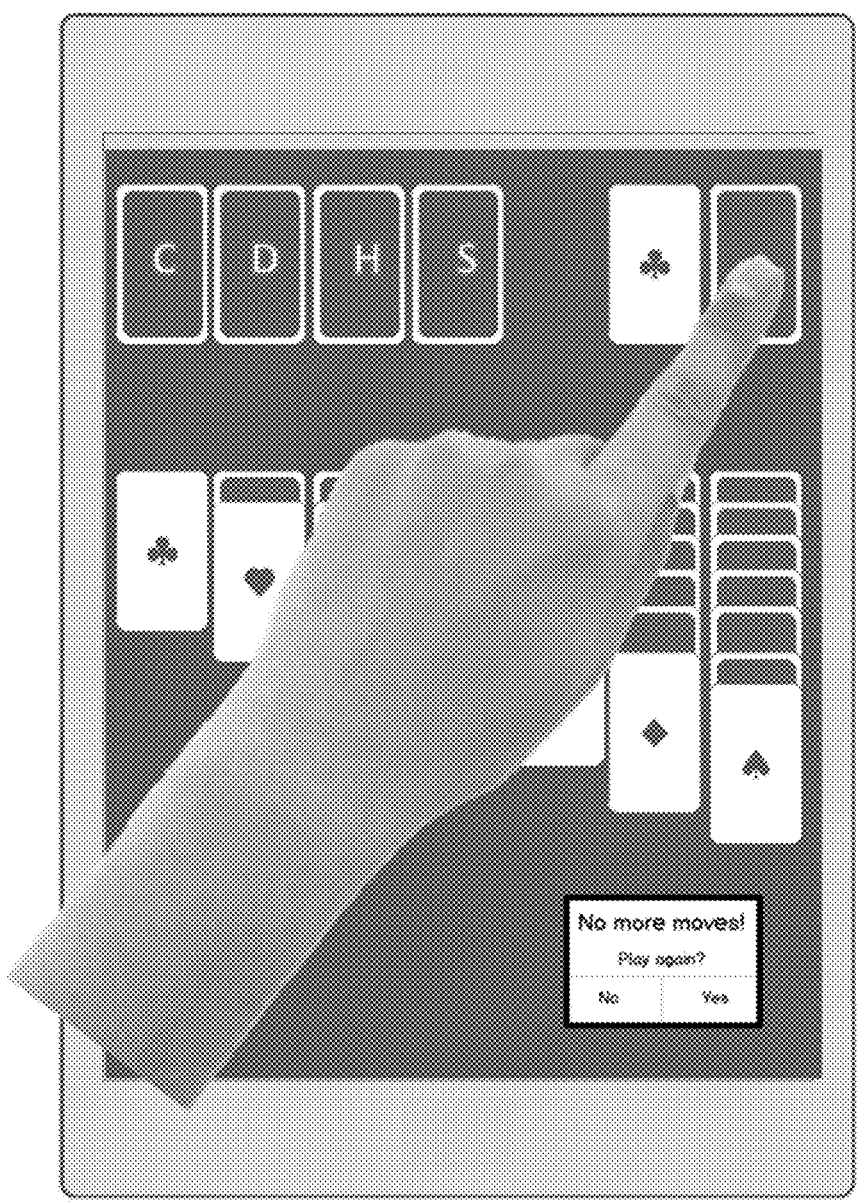
FIG. 7 exemplary depicts an adaptation of an interface of the screen to reduce the obscured area according to an embodiment of the present invention.

Using the invention of method 100, the obscured area that is determined and learned is shown in FIG. 5 via the cross-hashed section. As is shown, the alert box is entirely obscured as well as most of the playing region of the card game. However, as shown in FIG. 6, in response, the alert box is placed outside the obscured area (e.g., the interface of the screen is adapted to change an interference by the hand of the user). Indeed, as shown in FIG. 7, the alert box is viewable while the user is playing the game and their hand is covering the screen.

Figure 8:
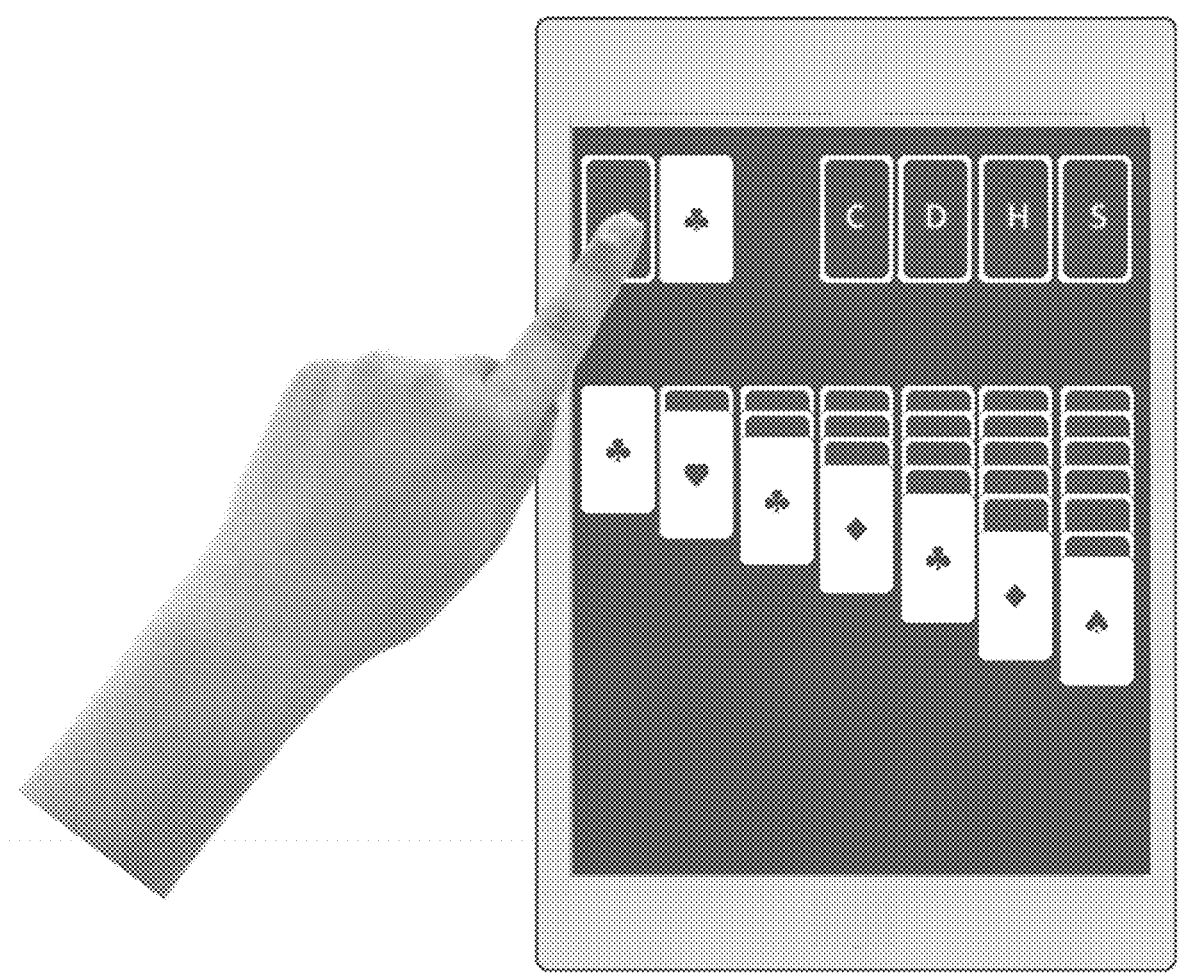
FIGS. 8-9 exemplary depict a second adaptation of the interface of the screen to reduce the obscured area according to an embodiment of the present invention.
Figure 9:
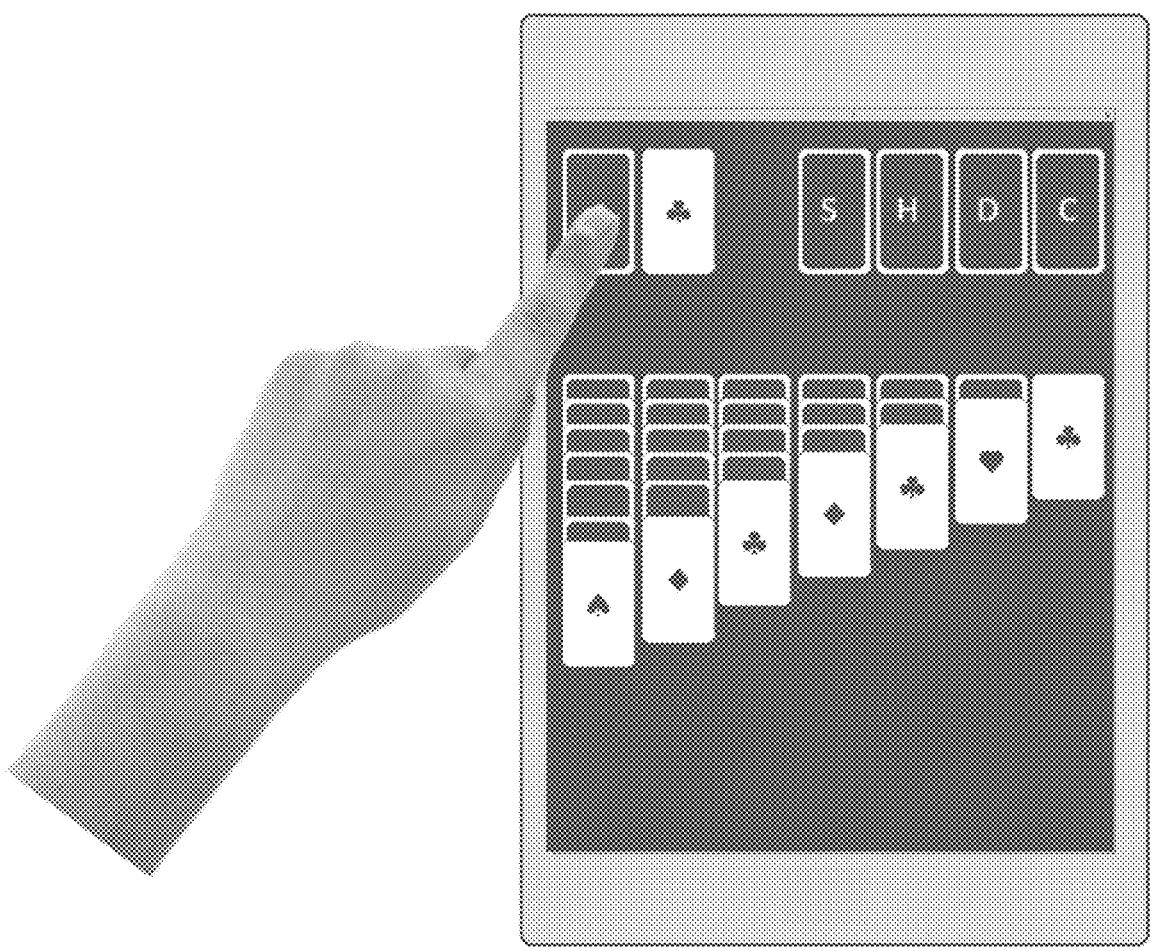

FIGS. 8-9 exemplarily depict the layout being adjusted to reduce the problem of obscurement, given the user's recent actions. For this left-handed user, the most frequently used action is moved to the left of the screen (FIG. 8). An alternate adaptation is a mirror transformation along the y-axis as shown in FIG. 9 that rearranges all the elements. This may be easier to implement, and may also reduce cognitive load for the user to quickly adapt to the new layout.

In one embodiment, instead of adapting the user-interface of a touch-screen to reduce the obscured area, the obscured area and pattern learned over a time frame may be used to determine a "reach" of the user. For example, some applications may include alerts, GUI elements that require interaction, etc. in areas of the screen that are not obscured but are nevertheless hard to reach. Based on the learned pattern of the obscured area, elements on the screen may be moved into a location within the "reach" (i.e., at edges of the obscured area) such that the user may easily interact with these elements without requiring the user to re-adjust their hand on the device. This may eliminate fatigue from constantly being required to re-adjust their hand.

Thus, the invention provides a proactive adaption of the display screen. That is, the invention may arrange a next screen or adapt labels on the screen to avoid that portion of the screen. (i.e., the obscurement zone). The system also learns/infers which, for example, hand is being used. Moreover, the system can learn to detect a same hand of the user, a same angle, similar areas or use, etc.

Exemplar, Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations.

Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 10, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard. Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 11:
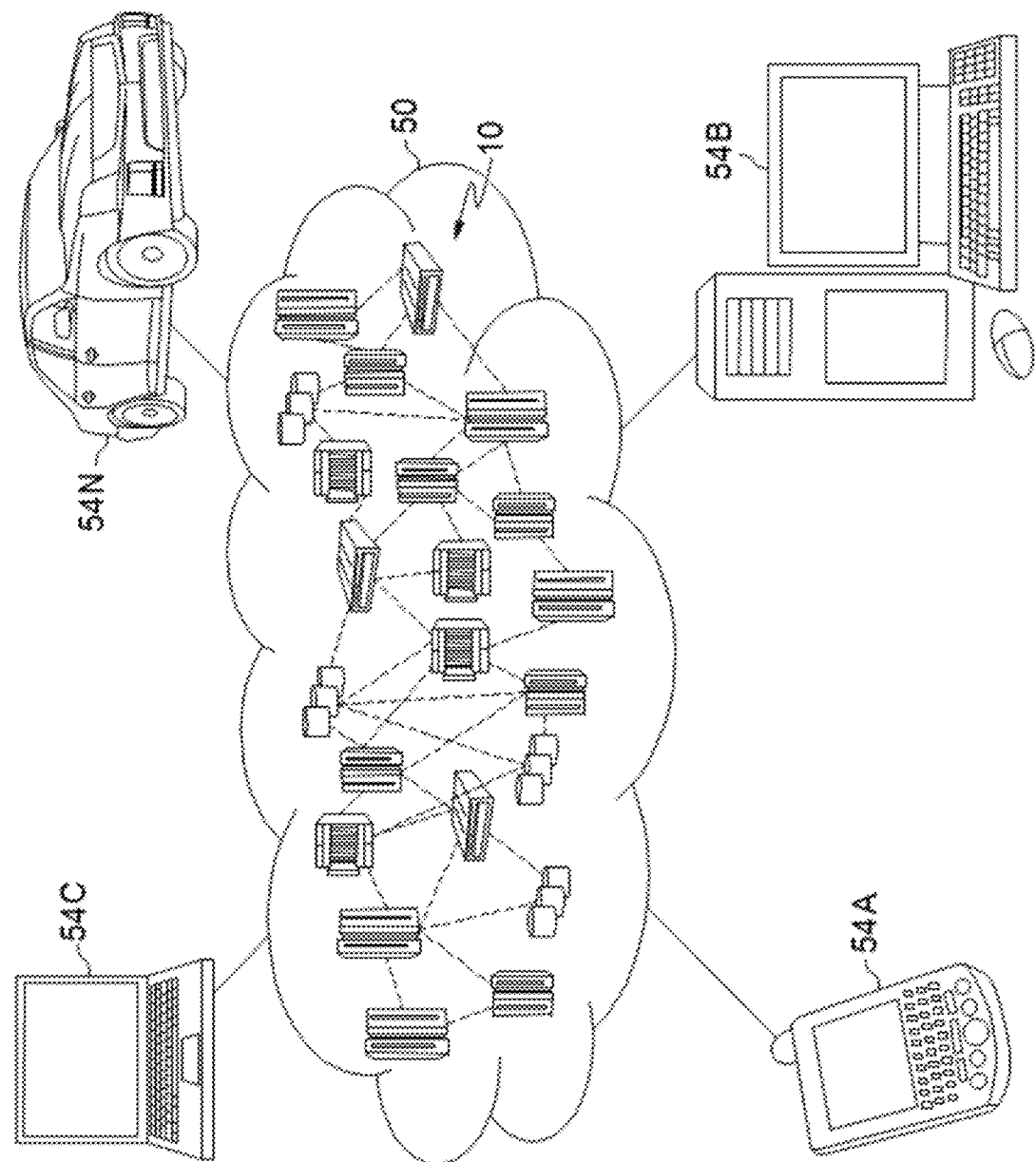
FIG. 11 depicts a cloud-computing environment 50 according to an embodiment of the present invention.

Referring now to FIG. 11, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 11) may communicate with one another. They may be grouped (not shown) physically or virtually, in one or more networks, such as Private, Community, Public, or Hybrid clouds as described hereinabove, or a combination thereof. This allows cloud computing environment 50 to other infrastructure, platforms and/or software as services for which a cloud consumer does not need to maintain resources on a local computing circuit. It is understood that the types of computing circuits 54A-N shown in FIG. 11 are intended to be illustrative only and that computing nodes 10 and cloud computing environment 50 can communicate with any type of computerized circuit over any type of network and/or network addressable connection (e.g., using a web browser).

Figure 12:
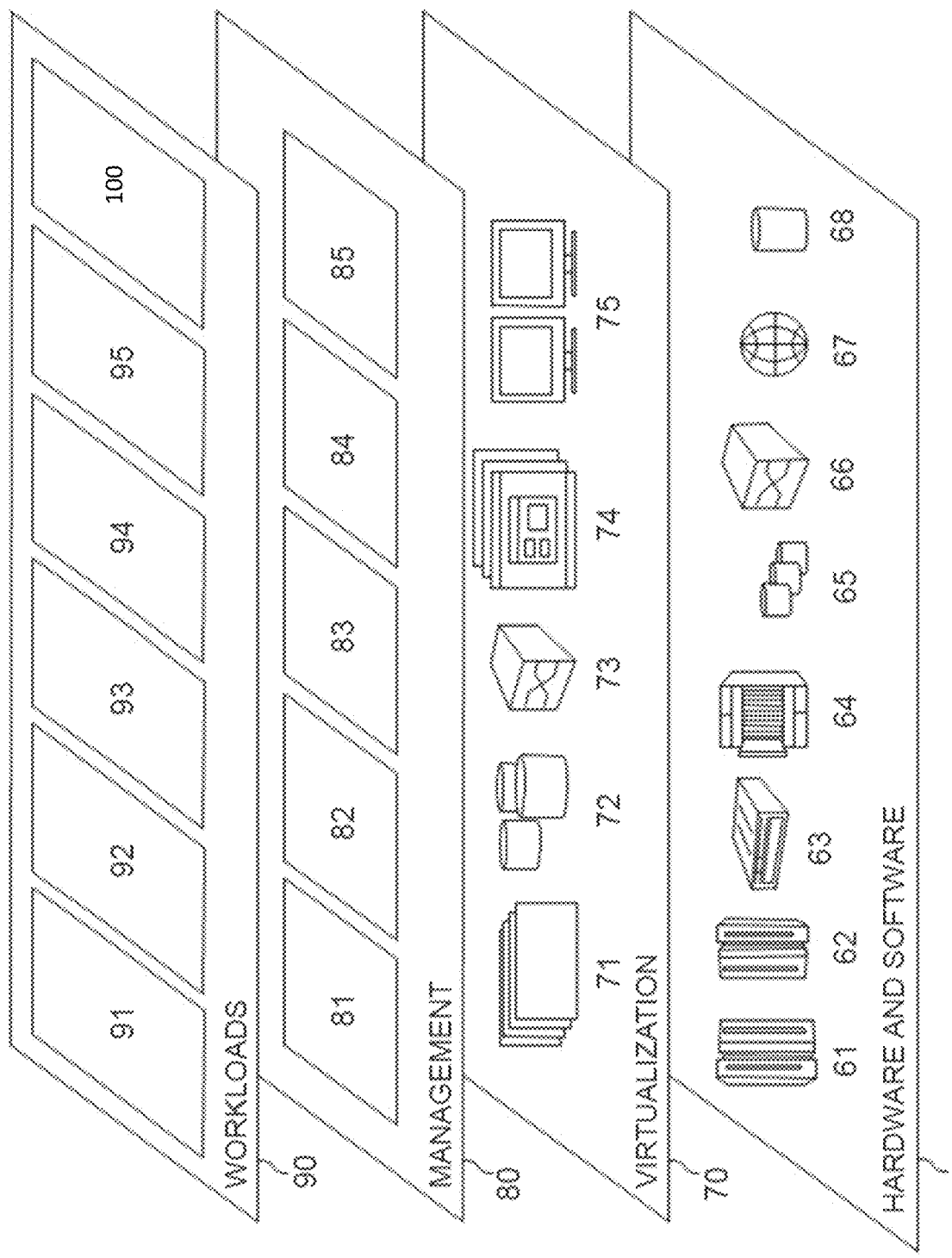
FIG. 12 depicts abstraction model layers according to an embodiment of the present invention.

Referring now to FIG. 12, an exemplary set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction. Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and display adaption method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, stroll that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented display adaption method of a touch-screen device, the method comprising:
   determining an obscured area of an interface of a screen of the touch-screen device for each application a user interacts with, wherein the determining is based on a factor consisting of:
   eye-wear;
   a default hand position of the user while holding the touch-screen device; and
   a motion of a hand of the user;
   determining a maximum reach of the default hand position of the user to interact with an object of the interface;
   learning a pattern of the obscured area of the screen that is obscured over a time frame based on the default hand position and the motion of the hand,
   predicting which area of a screen that the user is currently interacting with will be obscured based on the learned pattern, wherein a predicted obscured area of a screen of a first application is different than a predicted obscured area of a screen of a second application;
   adapting, based on the predicted area, the interface of a screen the user is currently interacting with, wherein the adapting changes the interface of the screen by changing an interference by the user with the interface of the screen such that the obscured area is reduced,
   wherein adapting the interface of the screen comprises moving an object of the interface of the screen the user is currently interacting with within the maximum reach of the default hand position,
   wherein the adapting the interface adapts a newly downloaded application,
   wherein the touch-screen device is obscured by a body part of the user, and
   wherein the change to the interface of the screen is saved and automatically performed on a next screen in a series of screens,
   further comprising making an alternate adaptation that consists of a mirror transformation along a y-axis of the screen to rearrange all of the objects of the interface about the y-axis to reduce a cognitive load for the user to adapt to a layout of the mirror transformation.

2. The computer-implemented display adaption method of claim 1, wherein the determining is performed via at least one camera on the device, and
   wherein the next screen in the series of screens includes a same interface as the interface detected with the obscured area.

3. The computer-implemented display adaption method of claim 1, wherein the determining is performed via near-field detection.

4. The computer-implemented display adaption method of claim 1, wherein the determining is performed via pressure-sensitive detection.

5. The computer-implemented display adaption method of claim 1, wherein the adapting is performed via a geometric projection.

6. The computer-implemented display adaption method of claim 1, wherein the adapting adapts the interface of each application installed on the touch-screen device.

7. The computer-implemented display adaption method of claim 1, wherein the adapting moves an element of the interface to a different location than a default location.

8. The computer-implemented display adaption method of claim 1, wherein the next screen in the series of screens includes a same interface as the interface detected with the obscured area.

9. The computer-implemented display adaption method of claim 1, wherein the change to the interface of the screen is saved and automatically performed apriori on the next screen to prevent the obscured area from occurring.

10. A computer program product for display adaption, the computer program product comprising a computer-readable storage medium having program instructions embodied therewith, the program instructions executable by a computer to cause the computer to perform:
    determining an obscured area of an interface of a screen of the touch-screen device that is obscured by a factor consisting of:
    eye-wear;
    a default hand position of a user while holding the touch-screen device; and
    a motion of a hand of the user;
    determining a maximum reach of the default hand position of the user to interact with an object of the interface;
    learning a pattern of the obscured area of the screen that is obscured over a time frame based on the default hand position and the motion of the hand;

predicting which area of a screen that the user is currently interacting with will be obscured based on the learned pattern, wherein a predicted obscured area of a screen of a first application is different than a predicted obscured area of a screen of a second application; and adapting, based on the predicted area, the interface of a screen the user is currently interacting with, wherein the adapting changes the interface of the screen by changing an interference by the user with the interface of the screen such that the obscured area is reduced, wherein adapting the interface of the screen comprises moving an object of the interface of the screen the user is currently interacting with within the maximum reach of the default hand position, wherein the adapting the interface adapts a newly downloaded application, wherein the touch-screen device is obscured by a body part of the user, and wherein the change to the interface of the screen is saved and automatically performed on a next screen in a series of screens, further comprising making an alternate adaptation that consists of a mirror transformation along a y-axis of the screen to rearrange all of the objects of the interface about the y-axis to reduce a cognitive load for the user to adapt to a layout of the mirror transformation.

11. The computer program product of claim 10, wherein the determining is performed via at least one camera on the device.

12. The computer program product of claim 10, wherein the determining is performed via near-field detection.

13. The computer program product of claim 10, wherein the determining is performed via pressure-sensitive detection.

14. The computer program product of claim 10, wherein the adapting is performed via a geometric projection.

15. The computer program product of claim 10, wherein the adapting adapts the interface of each application installed on the touch-screen device.

16. The computer program product of claim 10, wherein the adapting moves an element of the interface to a different location than a default location.

17. A display adaption system, the system comprising:
a processor; and
a memory, the memory storing instructions to cause the processor to perform:

determining an obscured area of an interface of a screen of the touch-screen device for each application a user interacts with, wherein the determining is based on a factor consisting of:
eye-wear;
a default hand position of the user while holding the touch-screen device; and
a motion of a hand of the user;

determining a maximum reach of the default hand position of the user to interact with an object of the interface;

learning a pattern of the obscured area of the screen that is obscured over a time frame based on the default hand position and the motion of the hand, predicting which area of a screen that the user is currently interacting with will be obscured based on the learned pattern, wherein a predicted obscured area of a screen of a first application is different than a predicted obscured area of a screen of a second application;

adapting, based on the predicted area, the interface of a screen the user is currently interacting with, wherein the adapting changes the interface of the screen by changing an interference by the user with the interface of the screen such that the obscured area is reduced, wherein adapting the interface of the screen comprises moving an object of the interface of the screen the user is currently interacting with within the maximum reach of the default hand position, wherein the adapting the interface adapts a newly downloaded application, wherein the touch-screen device is obscured by a body part of the user, and wherein the change to the interface of the screen is saved and automatically performed on a next screen in a series of screens, further comprising making an alternate adaptation that consists of a mirror transformation along a y-axis of the screen to rearrange all of the objects of the interface about the y-axis to reduce a cognitive load for the user to adapt to a layout of the mirror transformation.

18. The system of claim 17, wherein the adapting moves an element of the interface to a different location than a default location.

19. The system of claim 17, embodied in a cloud-computing environment.

* * * * *